(12) United States Patent
Su et al.

(10) Patent No.: US 11,245,679 B1
(45) Date of Patent: Feb. 8, 2022

(54) SECURING EXTERNAL ACCESS TO RUNTIME SERVICES IN APPLIANCES

(71) Applicant: Veritas Technologies LLC, Mountain View, CA (US)

(72) Inventors: Zhi Su, Beijing (CN); Li Zhen You, Beijing (CN); Xiaohong Liu, Beijing (CN)

(73) Assignee: Veritas Technologies LLC, Santa Clara, CA (US)

( * ) Notice: Subject to any disclaimer, the term of this patent is extended or adjusted under 35 U.S.C. 154(b) by 187 days.

(21) Appl. No.: 15/813,482

(22) Filed: Nov. 15, 2017

(51) Int. Cl.
*H04L 29/06* (2006.01)
*G06F 11/36* (2006.01)
*G06K 19/06* (2006.01)

(52) U.S. Cl.
CPC .......... *H04L 63/068* (2013.01); *G06F 11/362* (2013.01); *G06K 19/06037* (2013.01); *H04L 63/083* (2013.01)

(58) Field of Classification Search
CPC .... H04L 63/068; H04L 63/083; G06F 11/362; G06K 19/06037
USPC .......................................................... 726/6
See application file for complete search history.

(56) References Cited

U.S. PATENT DOCUMENTS

| | | | | |
|---|---|---|---|---|
| 4,809,170 A * | 2/1989 | Leblang | ..................... | G06F 8/71 707/999.202 |
| 5,752,032 A * | 5/1998 | Keller | ................... | G06F 13/102 719/311 |
| 5,870,588 A * | 2/1999 | Rompaey | ................ | G06F 30/30 703/13 |
| 5,910,180 A * | 6/1999 | Flory | ...................... | G06F 9/463 719/321 |
| 6,009,476 A * | 12/1999 | Flory | ....................... | G06F 9/54 719/324 |
| 6,418,442 B1 * | 7/2002 | Dwyer, III | ............ | G06F 9/4406 707/747 |
| 6,711,683 B1 * | 3/2004 | Laczko, Sr. | ............. | G06F 21/10 348/E5.004 |
| 7,558,987 B2 * | 7/2009 | Nardini | ............... | G06F 11/3636 714/38.1 |
| 8,261,089 B2 * | 9/2012 | Leon Cobos | .......... | G06F 21/43 713/185 |
| 8,839,184 B1 * | 9/2014 | Seguine | .................. | G06F 30/34 716/139 |
| 8,984,608 B2 * | 3/2015 | Sanno | ................... | G06F 16/957 726/7 |
| 9,021,443 B1 * | 4/2015 | Lachwani | .......... | G06F 11/3688 717/124 |
| 9,838,379 B1 * | 12/2017 | Bryan | ................... | H04W 76/10 |
| 10,320,613 B1 * | 6/2019 | Cam-Winget | .......... | H04W 4/70 |
| 10,554,641 B2 * | 2/2020 | Farrell | ............... | H04L 63/0853 |
| 2005/0240943 A1 * | 10/2005 | Smith | .................... | G06F 9/465 719/328 |

(Continued)

*Primary Examiner* — Tae K Kim
*Assistant Examiner* — Peiliang Pan
(74) *Attorney, Agent, or Firm* — Campbell Stephenson LLP

(57) ABSTRACT

Disclosed herein are methods, systems, and processes to secure external access to runtime systems in appliances. A request to register a security token configured to permit access to a computing system is received at the computing system. An authorization response authenticating the security token is sent. Another request to access the computing system based on the authenticated security token is received, and access is permitted to the computing system.

14 Claims, 11 Drawing Sheets

(56) References Cited

U.S. PATENT DOCUMENTS

| | | | |
|---|---|---|---|
| 2006/0090167 A1* | 4/2006 | Keohane | G06F 9/45512 719/319 |
| 2006/0277538 A1* | 12/2006 | Saha | G06F 11/1438 717/168 |
| 2009/0193493 A1* | 7/2009 | Becker | G06F 21/552 726/1 |
| 2009/0259612 A1* | 10/2009 | Hanson | H04L 69/22 706/47 |
| 2009/0282406 A1* | 11/2009 | Malki | G06F 9/5083 718/100 |
| 2010/0050161 A1* | 2/2010 | Nir-Buchbinder | G06F 9/52 717/126 |
| 2010/0083386 A1* | 4/2010 | Kline | G01R 31/31705 726/34 |
| 2010/0229219 A1* | 9/2010 | Mendonca | G06F 21/74 726/4 |
| 2011/0296164 A1* | 12/2011 | Boebert | G06F 21/604 713/150 |
| 2011/0296384 A1* | 12/2011 | Pasternak | G06F 11/3688 717/124 |
| 2013/0054960 A1* | 2/2013 | Grab | H04L 63/168 713/155 |
| 2013/0055223 A1* | 2/2013 | Xu | G06F 8/42 717/143 |
| 2013/0124855 A1* | 5/2013 | Varadarajan | G06Q 20/3276 713/155 |
| 2013/0141587 A1* | 6/2013 | Petricoin, Jr. | G07C 9/00111 348/156 |
| 2013/0275973 A1* | 10/2013 | Greenfield | G06F 9/44584 718/1 |
| 2013/0325704 A1* | 12/2013 | Gorman | G06Q 50/265 705/39 |
| 2013/0339327 A1* | 12/2013 | Belmar | G06F 13/24 707/703 |
| 2013/0339687 A1* | 12/2013 | Greiner | G06F 9/3857 712/229 |
| 2014/0181911 A1* | 6/2014 | Kula | H04L 63/0853 726/4 |
| 2014/0244456 A1* | 8/2014 | Huang | G06Q 40/123 705/31 |
| 2014/0359578 A1* | 12/2014 | Jesse | G06F 8/61 717/124 |
| 2015/0066782 A1* | 3/2015 | Vainberg | G06Q 10/20 705/305 |
| 2015/0088760 A1* | 3/2015 | Meurs | G06Q 20/425 705/72 |
| 2015/0235011 A1* | 8/2015 | Swaminathan | H04L 65/608 713/171 |
| 2015/0278805 A1* | 10/2015 | Spencer, III | G06Q 20/3278 705/44 |
| 2016/0005016 A1* | 1/2016 | Eliahu | G06Q 20/28 705/44 |
| 2016/0098334 A1* | 4/2016 | Hariharakrishnan | G06F 11/3428 702/186 |
| 2016/0366118 A1* | 12/2016 | Wang | H04L 63/108 |
| 2017/0126685 A1* | 5/2017 | Taylor | G06F 21/10 |
| 2017/0235490 A1* | 8/2017 | Tan | H04L 63/108 711/152 |
| 2017/0286268 A1* | 10/2017 | Lincoln | G06F 11/366 |
| 2017/0331791 A1* | 11/2017 | Wardell | H04L 67/2814 |
| 2018/0068132 A1* | 3/2018 | Zubair | G06F 21/6254 |
| 2018/0075231 A1* | 3/2018 | Subramanian | G06F 21/41 |
| 2018/0077144 A1* | 3/2018 | Gangawane | H04L 63/0815 |
| 2018/0121324 A1* | 5/2018 | Tucker | G06F 11/3636 |
| 2018/0248878 A1* | 8/2018 | El-Moussa | G06F 21/53 |
| 2018/0262505 A1* | 9/2018 | Ligatti | H04L 63/10 |
| 2018/0330368 A1* | 11/2018 | Slupesky | G06Q 20/3823 |
| 2019/0065990 A1* | 2/2019 | Sharma | G06N 5/04 |
| 2019/0075127 A1* | 3/2019 | Tesovic | H04L 63/30 |
| 2019/0097785 A1* | 3/2019 | Elenes | G06F 21/44 |
| 2019/0114160 A1* | 4/2019 | Yehuda | G06F 8/70 |
| 2019/0140834 A1* | 5/2019 | Medvinsky | H04L 9/3226 |

\* cited by examiner

US 11,245,679 B1

SECURING EXTERNAL ACCESS TO RUNTIME SERVICES IN APPLIANCES

FIELD OF THE DISCLOSURE

This disclosure relates to performing runtime operations in appliances. In particular, this disclosure relates to permitting and performing security token protected runtime debug operations in appliances using command line interfaces.

DESCRIPTION OF THE RELATED ART

Businesses use appliances to provide business services to customers. Appliances can be hardware devices with integrated software (e.g., firmware), designed to provide one or more business services. Appliances can also be virtual appliances. Virtual appliances are pre-configured virtual machine images and can be created by installing software appliances on virtual machines. Unlike general purpose computers, appliances are not designed to allow users to change the software (including the underlying operating system).

Appliances can also be configured with hardware and/or software to enable them to function as clients and/or servers. An end user of these clients and/or servers need not understand the technical details of the underlying operating system running on the appliances because the hardware and/or software is preconfigured (e.g., by a manufacturer) and unmodifiable. Therefore, appliances are designed to be secure black boxes for the end user (e.g., a customer), and thus are useful to address privacy and data security concerns in business computing.

Unfortunately, given the sensitive business purposes for which appliances are typically implemented, providing authorized technical support to customers of appliances can be challenging because of the conflicting requirement of protecting the security and integrity of the appliance (e.g., preventing access to sensitive internal services, and the like), while at the same time provisioning limited access (e.g., for runtime debugging purposes, and the like) to support engineers, system administrators, and other such authorized entities.

SUMMARY OF THE DISCLOSURE

Disclosed herein are methods, systems, and processes to secure external access to runtime systems in appliances. One such method involves receiving a request to register a security token configured to permit access to a computing system at the computing system, sending an authorization response authenticating the security token, receiving another request to access the computing system based on the authenticated security token, and permitting access to the computing system.

In one embodiment, the security token is included in a Quick Response (QR) code, and the authorization response authenticating the security token is sent or transmitted if the security token matches the QR code. In another embodiment, the another request is to enter a debug mode of an appliance, and permitting access to the computing system includes permitting entry to the debug mode of the appliance.

In some embodiments, the method involves determining that the access to the debug mode of the appliance has expired, and invalidating the security token associated with the request. In other embodiments, the debug mode is entered using a Command Line Interface Shell (CLISH), the request to register the security token is received at a Graphical User Interface (GUI) associated with the appliance, and the another request to enter the debug mode is received using the CLISH associated with the appliance.

In certain embodiments, the method involves permitting debugging of one or more input and/or output commands using the CLISH without entering an operating system of the appliance that would cause elevation of the authenticated security token to a root privilege and facilitating monitoring of a real-time output of the one or more output commands indicating a runtime state of the appliance regardless of the elevation prevention.

In one embodiment, authentication of the security token is based on a security token policy, and the security token policy limits the access to the debug mode of the appliance. In another embodiment, a log stored by the appliance reflects the runtime state of the appliance.

The foregoing is a summary and thus contains, by necessity, simplifications, generalizations and omissions of detail; consequently those skilled in the art will appreciate that the summary is illustrative only and is not intended to be in any limiting. Other aspects, features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects and features made apparent to those skilled in the art, by referencing the accompanying drawings.

Figure 1:
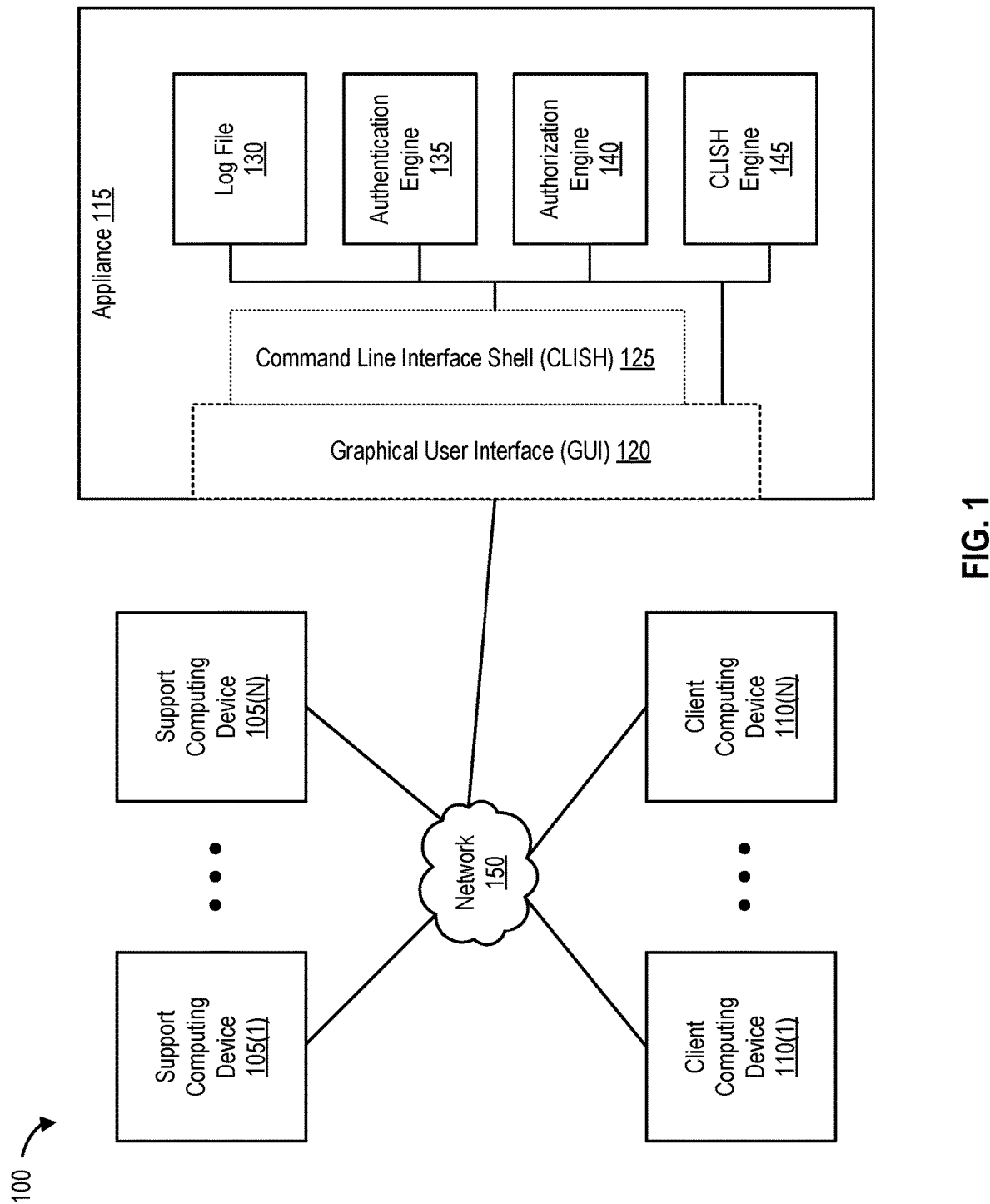
FIG. 1 is a block diagram 100 of an appliance implemented in a distributed computing system, according to one embodiment of the present disclosure.

While the disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure as defined by the appended claims.

DETAILED DESCRIPTION

Introduction

Appliances are discrete hardware devices with integrated software (e.g., firmware), specifically designed to provide a specific computing resource (e.g., access to one or more business services). Appliances can also be virtual appliances. Virtual appliances are configured to provide similar functionality as dedicated hardware appliances, but virtual appliances are distributed (e.g., to customers), as software virtual machine images in a hypervisor, or for a hypervisor-enabled device. In addition, customers can deploy appliances by integrating the software (e.g., operating system (OS) software) and the hardware of a computing device.

Appliance have exactly one combination of hardware, operating system, and application software (e.g., application software that is required to provide business services). Therefore, appliances can be deployed and managed by customers without extensive Information Technology (IT) knowledge. Once deployed however, appliances do not permit (and are not designed to allow) customers to change (or modify) the software (e.g., OS software). Therefore, appliances are designed to be secure black boxes, at least from the customer perspective.

Businesses use appliances to provide sensitive business services to customers. Software (e.g., application software and OS software in the appliance) that is configured provide these one or more business services (e.g., online banking, electronic commerce, and the like) requires one or more internal services for operation. For example, appliances can be configured to host a server that provides internal services such as database and/or web services required by the application software that provides online banking services.

Internal services are computing services (e.g., web services, database services, a message queue server, and the like) that are only provided to the software (e.g., application software and/or OS software) or the hardware of an appliance. Therefore, internal services provided by standalone appliances are not generally exposed to (and are not accessible by) users or other computing devices (e.g., external clients).

Therefore, given the sensitive business purposes for which appliances are typically implemented, providing authorized technical support to customers of appliances can be challenging because of the conflicting requirement of protecting the security and integrity of the appliance (e.g., preventing access to sensitive internal services, and the like), while at the same time provisioning limited access (e.g., for runtime debugging purposes, and the like) to support engineers, system administrators, and other such authorized entities.

For example, from a technical support perspective, runtime operations can be used to configure a dynamic computing environment and the visualization capability to understand the operational state of the computing environment (e.g., inner workings of the computing environment, decisions made regarding deployment of applications and allocation of hardware, and the like). Runtime operations can also be used to discover where in a virtual resource pool applications are executing, view the current state of the computing environment, and take administrative actions to facilitate debug operations, manageability, resilience, overriding administrative decisions, modifying application priority, and the like.

A CLI (command line interface) is a user interface to a computing system's OS or an application in which a user responds to a visual prompt by typing in a command on a specified line and receiving a response back from the computing system. The default shell of the CLI is called a CLISH (command line interface shell). CLISH can be implemented by a shell script, which is a computer program designed to be run by a command-line interpreter. Typical operations performed by shell scripts include file manipulation (e.g., a log file, and the like) and program execution, among others. CLISH is a restrictive shell because role-based administration controls the number and type of commands available in the shell, and access is not provided to low level system functions.

Therefore, given its restrictive nature in terms of access provision, CLISH is useful to facilitate limited access to runtime operations like debugging to external clients in an appliance-based computing environment (e.g., to validate input and check real time output), and is thus recommended for security and privacy reasons.

Unfortunately, provisioning secure access to runtime debug operations in an appliance using CLISH presents several challenges. First, debugging a command line's output in CLISH is complicated because support engineers and system administrators are unable to validate input and check runtime output in real-time because of security and access restrictions inherent in an appliance ecosystem. For example, such inputs and outputs are typically managed and catalogued by a log file which must be examined and analyzed at a later time to determine the state of a computing environment which, for example, could have changed and possibly digressed since the creation of the log file. Second, because no real-time access to runtime states is provided, current log mechanisms do not reflect the runtime states of such appliances. Third, granting laissez-faire access to multiple external clients to execute runtime commands (e.g., in debug mode) is risky because doing so potentially exposes sensitive business logic implementation in the appliance ecosystem.

Disclosed herein are methods, systems, and processes to secure external access to runtime systems in appliances while protecting the security and integrity of an appliance (e.g., preventing access to sensitive business logic implementation, and the like), while at the same time provisioning limited and secure access (e.g., for runtime debugging purposes, and the like) to support engineers, system administrators, and other such authorized entities.

Example Security Token Protected Appliance Ecosystem

FIG. 1 is a block diagram 100 of a security token protected appliance ecosystem, according to one embodiment. As shown in FIG. 1, such an appliance ecosystem includes at least support computing devices 105(1)-(N), client computing devices 110(1)-(N), and one or more appliances such as appliance 115. Support computing devices 105(1)-(N), client computing devices 110(1)-(N), and appliance 115 can each be any of a variety of different types of computing devices, including a server, personal computing device, laptop computer, net book, personal digital assistant, cellular phone, or the like. Network 150 can be a local area network (LAN), a Wide Area Network (WAN, a Storage Area Network (SAN), the Internet, and the like, (or any other appropriate network and/or interconnection).

Appliance 115 includes at least a graphical user interface (GUI) and a command line interface shell (CLISH) 125, manages a log file 130, and implements an authentication engine 135, an authorization engine 140, and a CLISH engine 145. In this example, log file 130 identifies, stores, records, manages, and/or catalogues one or more runtime operations performed with respect to the appliance 115 and/or one or more runtime states of appliance 115. For examples, log file 130 can identify one or more debug operations performed in appliance 115, the time those debug operations were performed, the input and runtime output associated with those debug operations, various runtime states of appliance 115, and the like. Log file 130 can be accessed by or transmitted to support computing devices 105(1)-(N).

Support computing devices 105(1)-(N) are computing devices that are configured to provide technical support to appliance 115 (e.g., using a support engineer, a system administrator, various support software and/or hardware programs, and/or other such entities and/or personnel). Client computing devices 110(1)-(N) are computing devices that are associated with appliance 115 and are managed in conjunction with appliance 115 (e.g., by a customer administrator, and the like) to facilitate secure and authorized access to appliance 115 by support computing devices 105(1)-(N).

Authentication engine 135 authenticates and/or verifies one or more requests received from a support computing device (e.g., a security authentication request requesting authentication to provide technical support services to appliance 115) at a graphical user interface (GUI) associated with appliance 115 (e.g., GUI 120). Such authentication requests can include security tokens (e.g., in the form of Quick Response (QR) codes, and the like generated by client computing devices 110(1)-(N) for support computing devices 105(1)-(N)). Authorization engine 140 authorizes and permits one or more support computing devices to securely access appliance 115 (e.g., using a command line interface (CLI) such as CLISH 125) based on an authentication result determined and provided by authentication engine 135. CLISH engine 145 permits support computing devices 105(1)-(N) to perform one or more runtime operations in appliance 115 using restricted CLISH commands (e.g., one or more debug operations for a pre-determined amount of time, among other operations).

Example Secure Appliance that Permits Runtime Operations in CLISH

Figure 2:
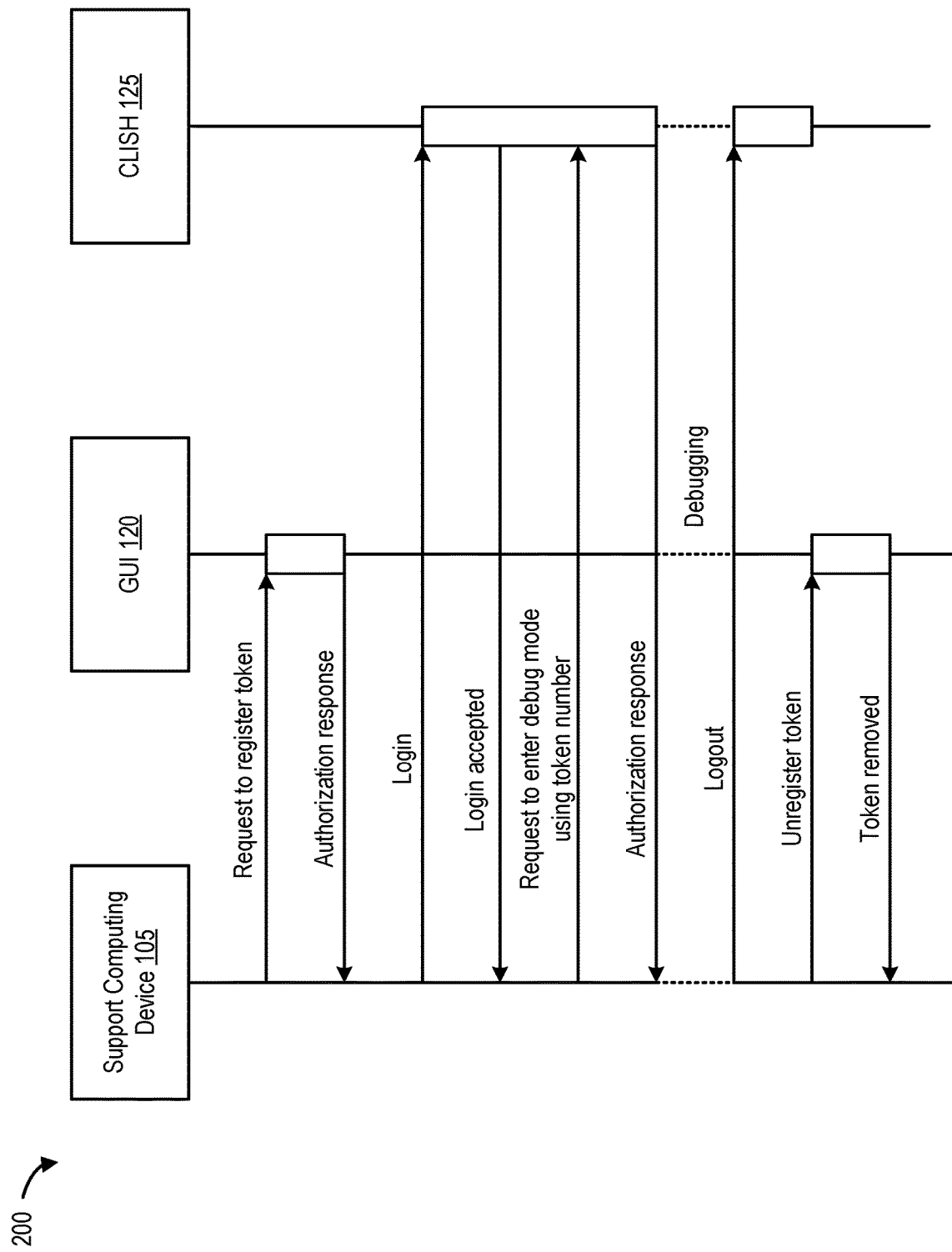
FIG. 2 is a block diagram 200 and illustrates a runtime command line debug system, according to one embodiment of the present disclosure.

FIG. 2 is a block diagram 200 and illustrates a runtime command line debug system, according to one embodiment. As shown in FIG. 2, support computing device 105 sends a request to register a security token to appliance 115 using GUI 120. For example, client computing device 110 can create a temporary QR code with security token authorization for support computing device 105, and support computing device 105 can use an application or a program to scan the QR code. If the security token is authenticated, support computing device 105 receives an authorization response from appliance 115 via GUI 120. Support computing device 105 then logs into (e.g., is permitted access to) appliance 115 using CLISH 125 (e.g., using one or more available and authorized command line interface shell commands and/or scripts) upon which appliance 115 accepts the CLISH-initiated login.

Upon logging into CLISH-enabled appliance 115, support computing device 105 sends a request to enter debug mode in appliance 115 using the security token number. If the security token has been authenticated (e.g., using authentication engine 135), support computing device 105 is permitted entry to debug mode using CLISH 125. At this point, support computing device 105 is permitted to perform one or more runtime debug operations (e.g., input validation, analysis of runtime output, log file access, and the like). After completing one or more runtime operations and/or after being permitted access to debug mode for a pre-determined period of time (e.g., by CLISH engine 145), support computing device 105 logs out of appliance 115 using CLISH 125 and unregisters the security token (e.g., using GUI 120). Appliance 115 (e.g., using authorization engine 140) then removes, deletes, and/or discards the (previously-registered) security token.

In some embodiments, performing one or more runtime debug operations causes the creation of one or more entries in a log file (e.g., log file 130 as shown in FIG. 1). The log file can store entries related to kernel messages, command error codes, command error messages, and the like. Therefore, detailed runtime information can be made available for technical support purposes by providing a controlled and secure debug session (e.g., using token control policy).

In other embodiments, token control policy implemented by appliance 155 limits access of support computing devices 105(1)-(N) to just the aforementioned debug mode. Client computing devices 110(1)-(N) associated with appliance 155 (e.g., computing devices managed by the same person and/or entity that manages appliance 115) can serve an administrative role by providing a Quick Response (QR) code to one or more of support computing devices 105(1)-(N). Because a valid QR code is necessary to be permitted access to appliance 115, support computing devices 105(1)-(N) can be allowed pre-determined, specific, narrow, and limited access to a debug menu or a debug interface implemented in appliance 115 that is configured for support computing devices 105(1)-(N) to view and/or manipulate the state of one or more problematic computer programs (or devices) executing on or associated with appliance 115 to identify and/or remove errors during a debug session (e.g., using real-time information captured instantaneously in a log file when one or more debug commands are executed as part of debug mode, among other techniques). For example, support computing devices 105(1)-(N) can debug command(s) during a pre-determined number of sessions (e.g., which can be limited by length of time (e.g., a single 10 minute debug session can be provided), privileges permitted, the type and the number commands that can be executed, and the like) and simply toggle off debug mode.

Figure 3:
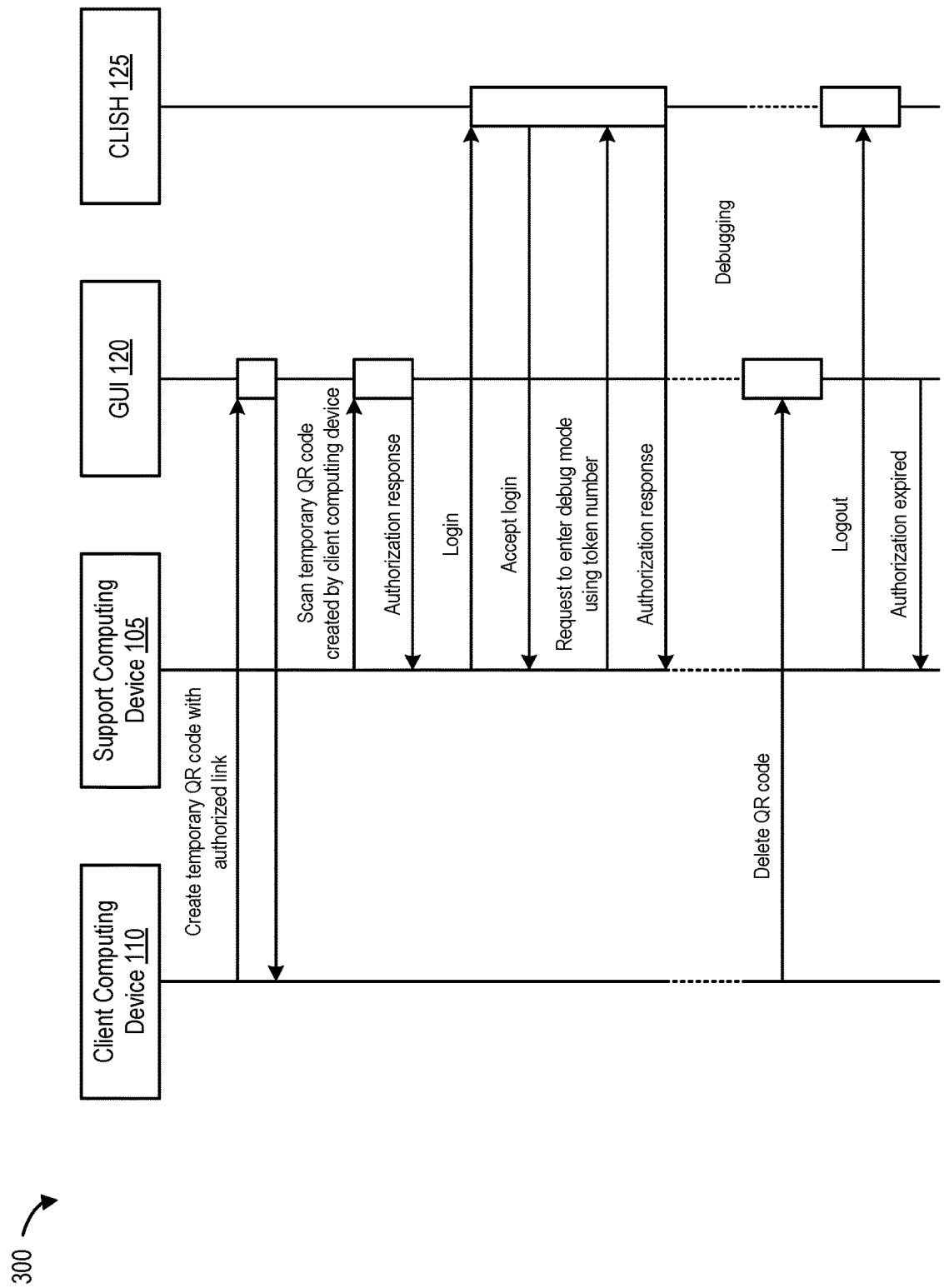
FIG. 3 is a block diagram 300 and illustrates a runtime command line debug system, according to one embodiment of the present disclosure.

FIG. 3 is a block diagram 300 and illustrates a runtime command line debug system, according to one embodiment. As shown in FIG. 3, client computing device 110 associated with appliance 115 creates a temporary QR code with an authorized link. It should be noted that in certain embodiments, in addition to QR codes, other types of barcodes other than (or in addition to) QR codes can be created and provided by client computing device 110 and/or appliance 115 to facilitate secure technical support from support computing system 105. For example, client computing device 110 and/or appliance 115 can create and provide linear barcodes, other matrix (2D) barcodes (e.g., ContoSign, EZcode, and the like), and/or any other type of optical, machine-readable, representation of data that can be scanned and processed by smartphone cameras, optical scanners, barcode readers, and the like. After client computing device 110 creates the temporary QR code, client computing device 110 sends the QR code with the authorized link to support computing device 105. Support computing device receives the QR and uses the authorized link to begin the secure entry process into appliance 115.

In one embodiment, support computing device 105 scans the temporary QR code created by client computing device 110. The scanning of the temporary QR code initiates an authorization request that is sent from support computing device 105 to appliance 115 (e.g., via GUI 120). Appliance 115 then sends an authorization response to support computing device 105 based on whether the temporary QR code contains a security token that is authorized to be registered on appliance 115. If authorized, support computing device 105 logs in to appliance 115 using CLISH 125. CLISH 125 accepts the login from support computing device 105.

At this point, authorization engine 140 can be used to enable debug mode (e.g., using GUI 120) to allow support computing device 105 to enter the debug mode. In addition, and to enable the performance of runtime operations using CLISH 125, CLISH engine 145 modifies CLISH 125 to support the debug mode method authorized by authorization engine 140 for support computing device 105. In these examples, runtime CLISH enables support computing device 105 to examine the current internal state of one or more devices, configurations, programs, processes, and the like associated with and/or executing on appliance 105 by providing real-time access to runtime output (e.g., captured in log file 130).

As previously noted, current log analysis mechanisms do not reflect current internal runtime states, which can change frequently. Because support computing devices do not typically have access to real-time runtime output, the delay caused by waiting for runtime output to diagnose and fix problems in closed computing environments (e.g., appliance computing environments) is undesirable at least because technical support cannot be provided in a real-time and timely manner, and the current internal state of an appliance could have changed before such technical support action is able to be taken. Therefore, to ameliorate these shortcomings, support computing device 105 requests to enter debug mode using the (validated) security token and enters the debug mode in appliance 115 after an authorization response is received from CLISH 125 in response to the request from support computing device 105. The entry to debug mode using CLISH 125 is permitted because CLISH engine 145 modifies CLISH 125 to support one or more debug mode methods provided by authorization engine 140 to support computing device 105. Support computing device 105 performs debugging in appliance 115 using CLISH 125.

In certain embodiments, performing debugging in appliance 115 using CLISH 125 results in real-time output that is captured in log file 130. Because (real-time) log file 130 is available to support computing device 105 instantaneously after completion of one or more debug operations, timely technical support action can be taken to diagnose and repair one or more computing problems in appliance 115. Support computing device 105 can then log out of CLISH 125. The logging off of support computing device 105 from CLISH 125 causes client computing device 110 to delete the QR code associated with the debug session access provided to support computing device 105 and appliance 115 (which is informed of the QR code deletion and/or removal by client computing device 110). Appliance 115 sends an authorization expired notification to support computing device 105 terminating access to appliance 115.

In one embodiment, support computing device 105 enters debug mode in appliance 115 after support computing device 105 receives an authorization implemented by a security token and/or a QR code (e.g., from an authorization service implemented by client computing device 110 and/or appliance 115) to configure appliance 115 in debug mode. In this example, the authorization service authenticates the security token and authorizes access to debug mode, and support computing device 105 uses the authorized security token to enter debug mode in appliance 115. After debugging is performed, client computing device 110 cancels the authorization. Using information gleaned from the debugging, support computing device 105 can validate whether parameters (e.g., of inputted debug commands) are correct, and can determine whether the runtime output in phases is expected or unusual.

In another embodiment, client computing device 110 (e.g., an appliance customer) creates a temporary QR code with security token authorization capabilities. In this example, support computing device 105 (e.g., a support engineer) uses an application (e.g., a, mobile QR code scanning application installed on a smartphone, tablet, and the like) to scan the QR code to enter debug mode in appliance 115 using CLISH 125. After debugging has been performed (e.g., based on the limits set by a security token policy), support computing device 105 logs out from CLISH 125 and the authorization expires.

Example Processes to Permit and Perform Runtime Operations in CLISH

Figure 4A:
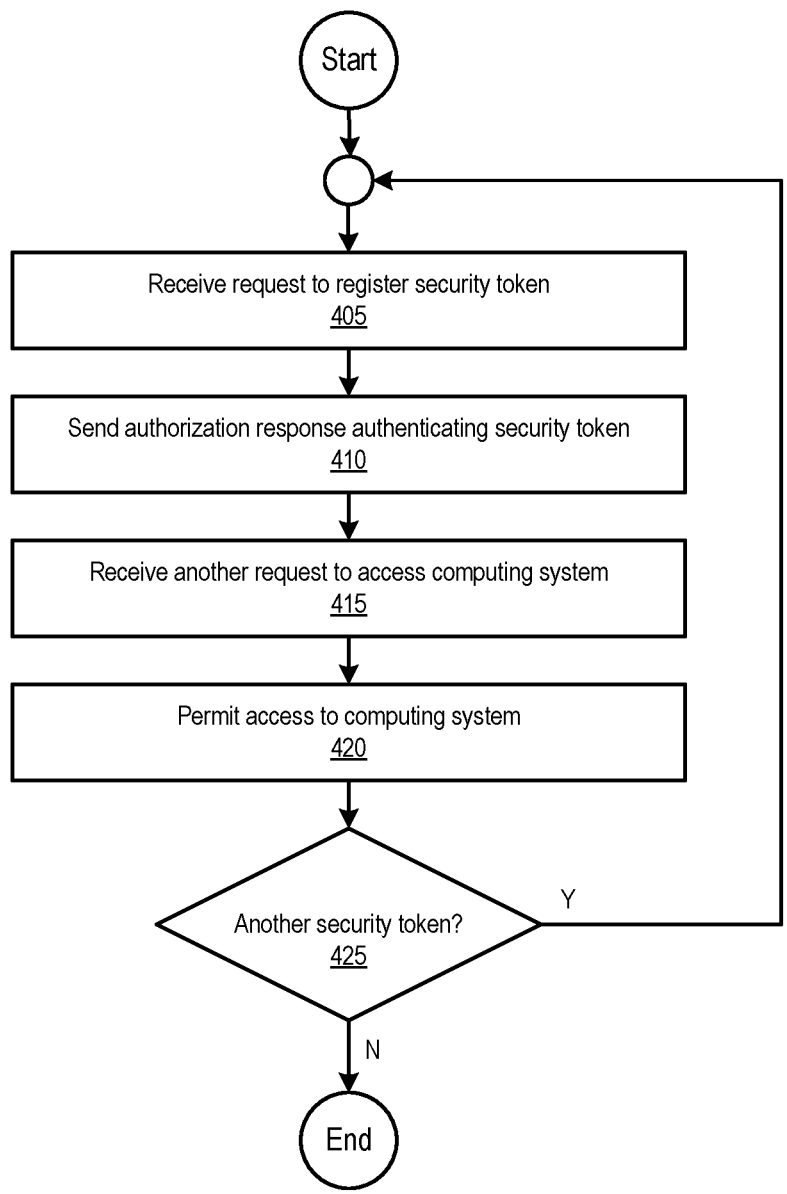
FIG. 4A is a flowchart 400A and illustrates a process for permitting secure access to a computing system, according to one embodiment of the present disclosure.

FIG. 4A is a flowchart 400A and illustrates a process for permitting secure access to a computing system, according to one embodiment. The process begins at 405 by receiving a request to register a security token. Such a request can be sent by support computing device 105 and can be received by appliance 115 (e.g., at GUI 120). At 410, the process sends an authorization response authenticating the security token. For example, appliance 115 can send an authorization response to support computing device 105 using GUI 120. At 415, the process receives another request to access a computing system (e.g., debug mode in appliance 115 using CLISH 125). Such a request can be received from support computing device 105 at a command line interface of the computing system.

At 420, the process permits access to the computing system. In some embodiments, support computing device 105 is permitted to enter debug mode in appliance 115 using the security token to perform one or more debugging operations for a pre-determined period of time (e.g., one (1) hour according to a security token policy). In other embodiments, support computing device 105 can debug one or more input and/or output commands using CLISH 125 without entering the operating system (OS) of appliance 115 (e.g., an entry would require the undesirable elevation of the authenticated security token to root privilege, among other security vulnerabilities) while still facilitating monitoring of real-time output of the one or more output commands indicating a runtime state of appliance 115). At 425, the process determines if there is another security token to be registered (e.g., as part of another security token registration request by support computing device 105). If there is another security token to be registered, the process loops to 405. Otherwise, the process ends.

Figure 4B:
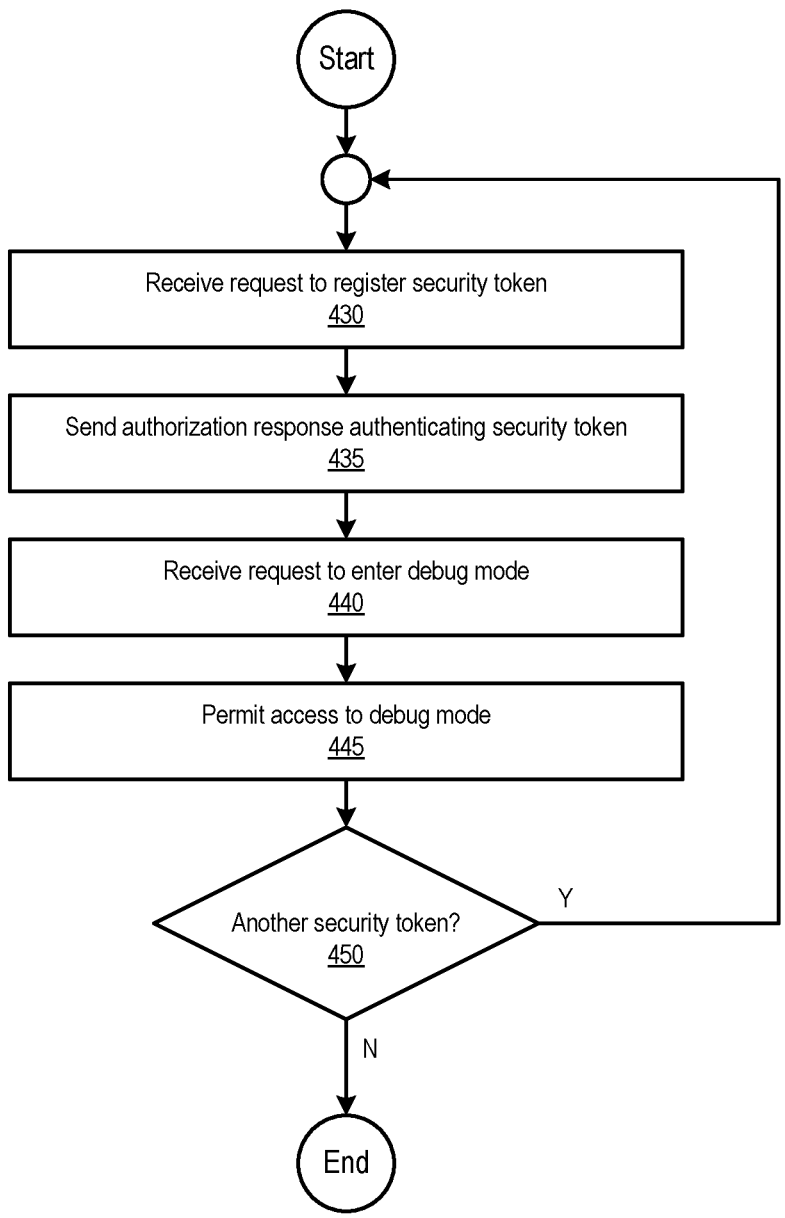
FIG. 4B is a flowchart 400B and illustrates a process for permitting secure access to debug mode in an appliance, according to one embodiment of the present disclosure.

FIG. 4B is a flowchart 400B and illustrates a process for permitting secure access to debug mode in an appliance, according to one embodiment. The process begins at 430 by receiving a request to register a security token (e.g., from support computing device 105). At 435, the process sends an authorization response authenticating the security token (e.g., using GUI 120 shared by support computing device 105 and appliance 115). At 440, the process receives a request to enter debug mode, and ends at 445 by permitting access to debug mode (e.g., to permit performance of one or more debugging operations for a pre-determined period of time (e.g., one (1) hour according to a security token policy).

Figure 5A:
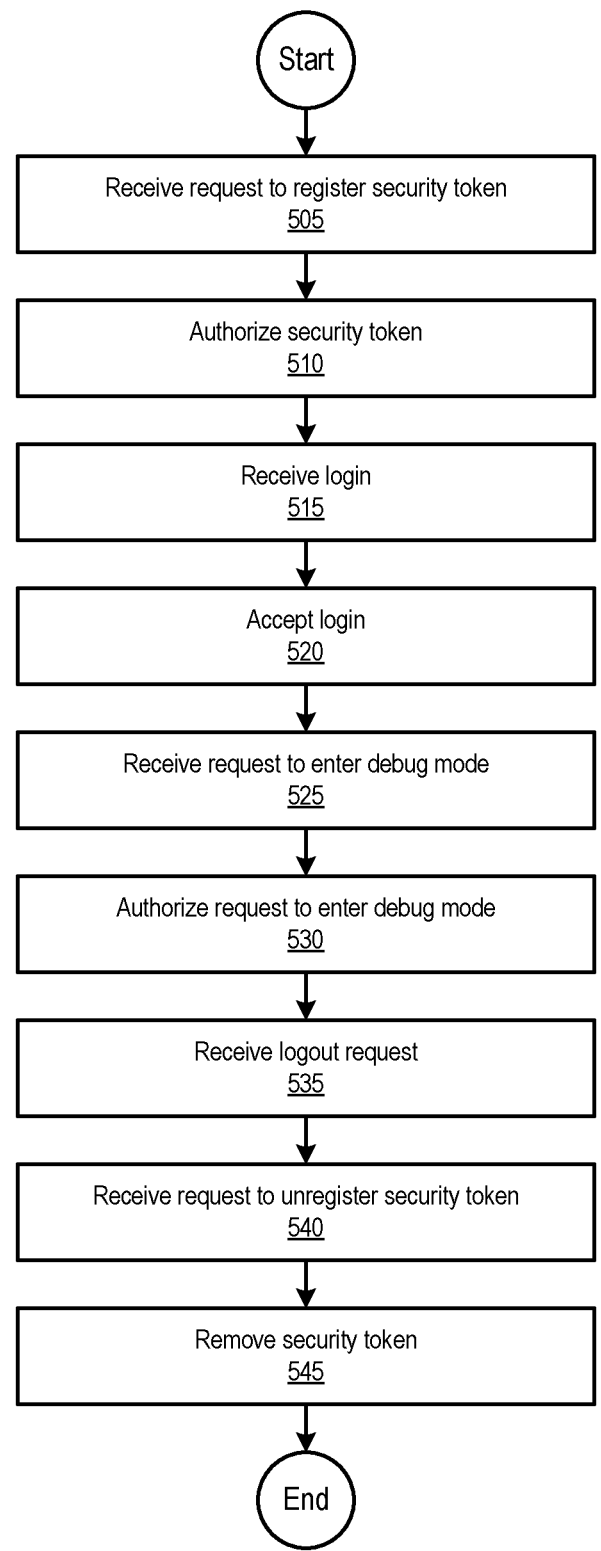
FIG. 5A is a flowchart 500A and illustrates a process for providing security token based access to an appliance, according to one embodiment of the present disclosure.

FIG. 5A is a flowchart 500A and illustrates a process for providing security token based access to an appliance, according to one embodiment. The process begins at 505 by receiving a request to register a security token (e.g., at GUI 120 of appliance 115 shared by appliance 115 and support computing device 105). At 510, the process authorizes the security token, and at 515 receives a login (e.g., from support computing device 105). At 520, the process accepts the login, and at 525, receives a request to enter debug mode (e.g., of appliance 115 using CLISH 125). At 530, the process authorizes the request to enter the debug mode (e.g., to permit performance of one or more debugging operations using CLISH 125). At 535, the process receives a logout request, and at 540, the process receives a request to unregister the security token. The process ends at 545 by removing the security token.

Figure 5B:
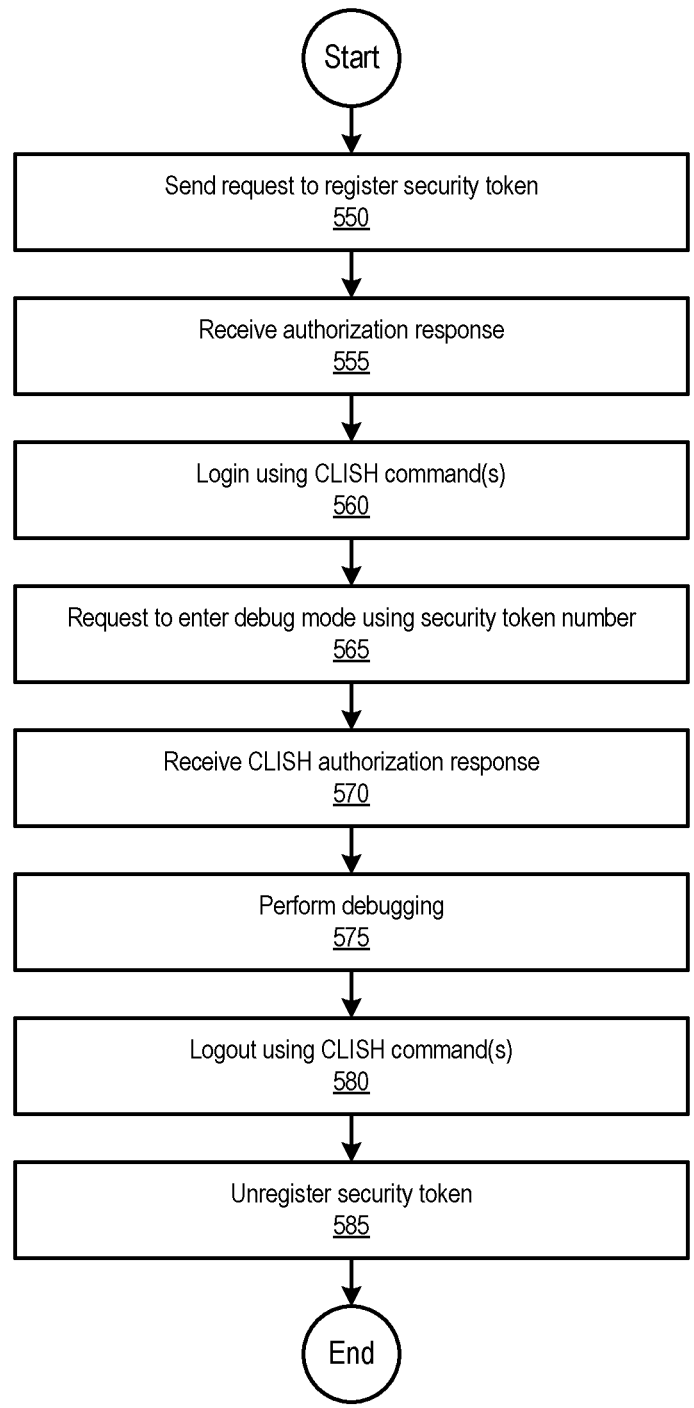
FIG. 5B is a flowchart 500B and illustrates a process for providing access to debug mode of an appliance using a command line interface, according to one embodiment of the present disclosure.

FIG. 5B is a flowchart 500B and illustrates a process for providing access to debug mode of an appliance using a command line interface, according to one embodiment. The process begins at 550 by sending a request to register a security token, and at 555, receives an authorization response (e.g., from appliance 115 via GUI 120). At 560, the process logs in using CLISH commands (e.g., using CLISH 125 or another comparable command line interface shell). At 565, the process requests to enter debug mode using a security token number, and at 570, receives a CLISH authorization response (e.g., permitting access to debug mode of appliance 115). At 575, the process performs debugging, and at 580, logs out of debug mode using CLISH commands. The process ends at 585 by unregistering the security token.

Figure 6:
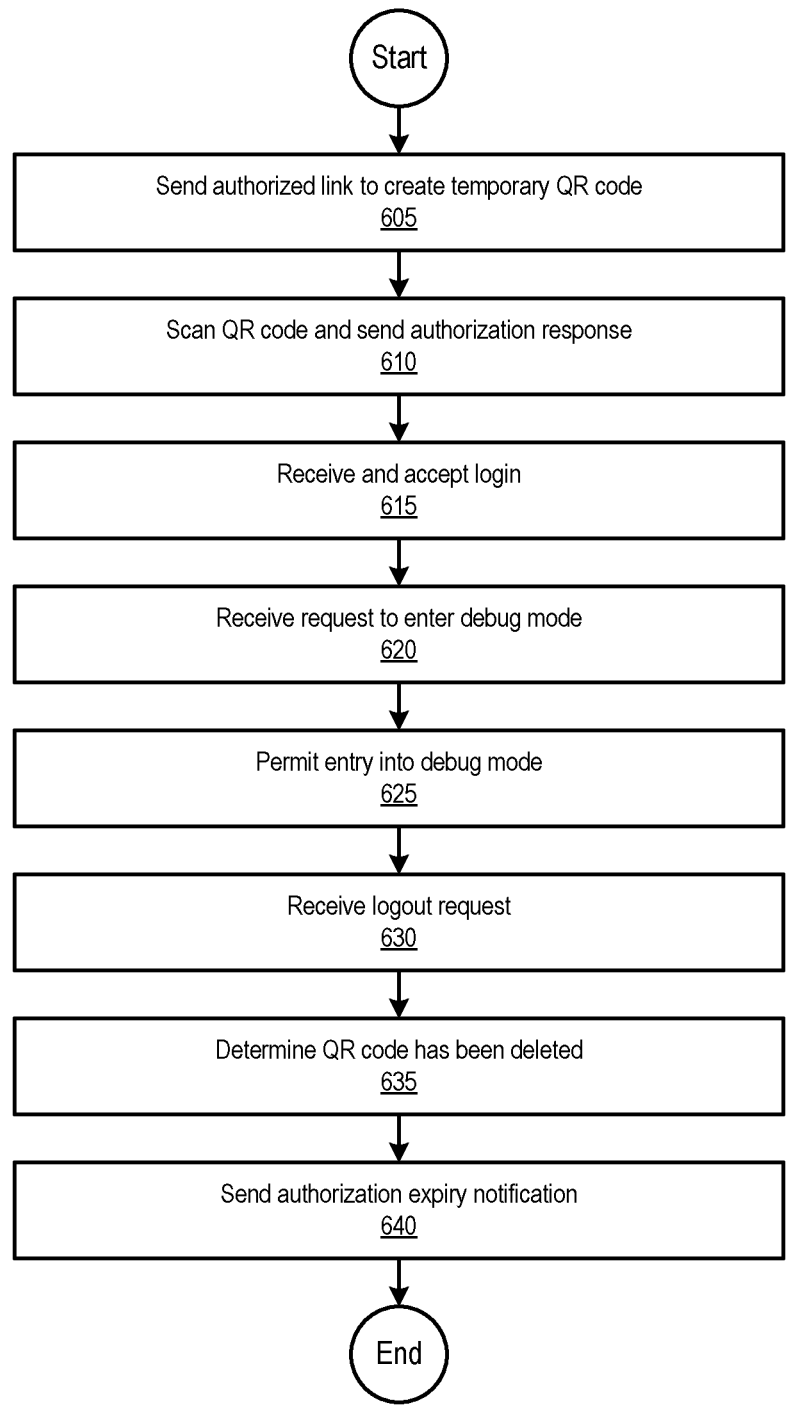
FIG. 6 is a flowchart 600 and illustrates a process for permitting secure debug operations at runtime in appliances using command line interfaces, according to one embodiment of the present disclosure.

FIG. 6 is a flowchart 600 and illustrates a process for permitting secure debug operations at runtime in appliances using command line interfaces, according to one embodiment. The process begins at 605 by sending an authorized link to create a temporary QR code, and at 610, scans the QR code and sends an authorization response. At 615, the process receives and accepts a login, and at 620, receives a request to enter debug mode. At 625, the process permits entry into debug mode, and at 630, receives a logout request. At 635, the process determines whether the QR code has been deleted, and ends at 640 by sending an authorization expiry notification (e.g., to support computing device 105).

Figure 7:
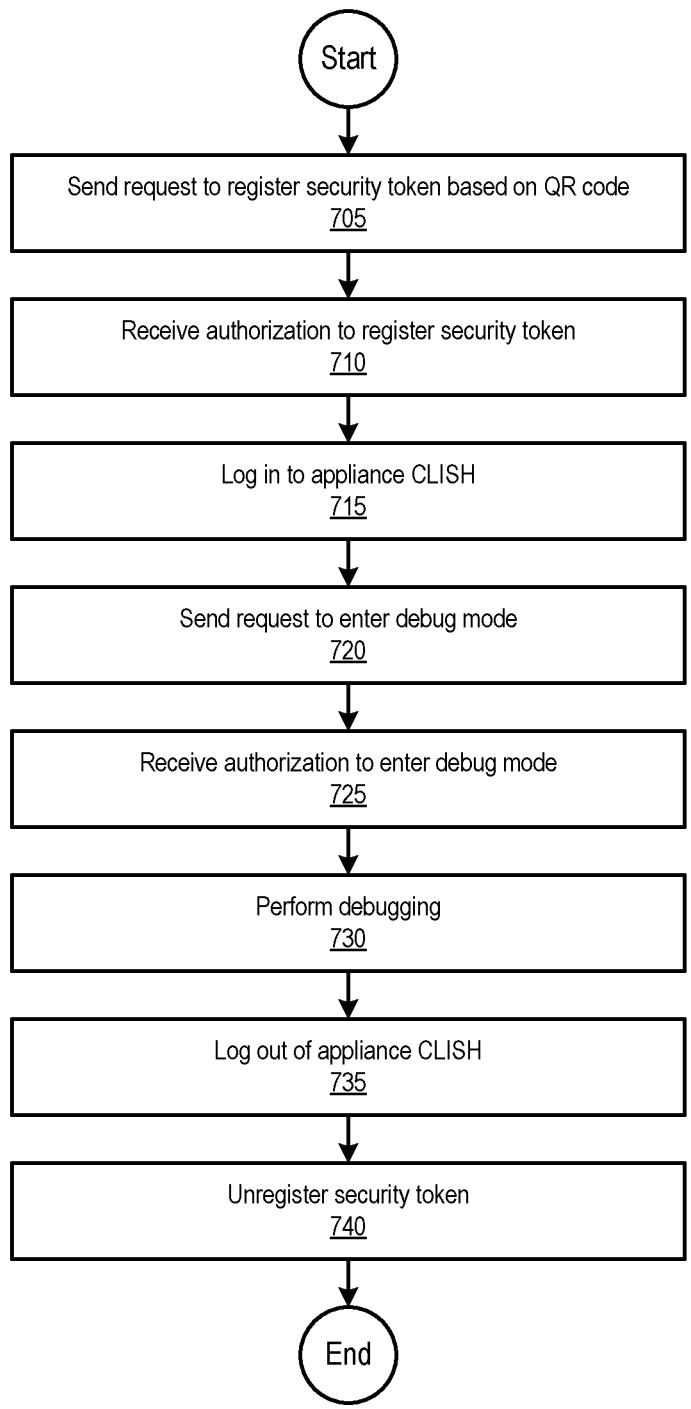
FIG. 7 is a flowchart 700 and illustrates a process for performing secure debug operations at runtime in appliances using command line interfaces, according to one embodiment of the present disclosure.

FIG. 7 is a flowchart 700 and illustrates a process for performing secure debug operations at runtime in appliances using command line interfaces, according to one embodiment. The process begins at 705 by sending a request to register a security token based on a QR code. At 710, the process receives authorization (e.g., from appliance 115 via GUI 120) to register the security token. At 715, the process logs in to appliance CLISH (e.g., to CLISH 125 of appliance 115). At 720, the process sends a request to enter debug mode (e.g., using one or more command line interface commands entered using CLISH 125), and at 725, receives authorization to enter debug mode. At 730, the process performs debugging, and at 735, logs out of appliance CLISH. The process ends at 740 by unregistering the security token. Securing external access to runtime systems in this manner can ensure the integrity of an appliance ecosystem, while at the same time provisioning limited and secure (but much needed) access to support engineers, system administrators, and other such authorized entities.

Example CLISH Engine

The following illustrates one or more embodiments of one or more example commands for a CLISH engine that is implemented in an appliance ecosystem in conjunction with an authentication engine and an authorization engine:

// Step 1: Debug Command
Network>debug configure eth1 1.1.1.2 255.255.255.0 1.1.1.1 eth1
Token: <security token number displayed in application and/or hardware token>
. . .
// Step 2: Enter Global Debug Mode
Network>debug mode on
Token><security token number displayed in application and/or hardware token>
Network>debug configure eth1 1.1.1.2 255.255.255.0 1.1.1.1 eth1
. . .
Network>debug mode off It will be appreciated that the methods, systems, and processes described herein combine authentication and authorization with a real-time CLISH (e.g., command line) debug system. A runtime environment can be challenging to reproduce if problems occur during configuration, for example. The methods, systems, and processes described herein permit the identification of technical and computing problems whenever such problems occur, for example, in programs, hardware, software, devices, and the like associated with appliance 115. A customer of appliance 115 (e.g., client computing device 110) can authorize support engineers (e.g., support computing device 105) to enter appliance 115 in debug mode in a secure manner without the support engineers being aware of and/or privy to security information associated with appliance 115 (e.g., sensitive usernames, passwords, and the like), and without being permitted to enter the OS of appliance 115 (e.g., which would require elevation to root privilege). In this manner, customers can control when and/or who accesses their secure appliances, and with security token control policy, customers can also limit the duration of such debug and/or technical support sessions. Further, because support engineers have real-time access to log files with necessary debugging data and/or information, technical issues can be diagnosed and solved in a time and cost effective manner, while maintaining appliance security.

Example Computing Environment

Figure 8:
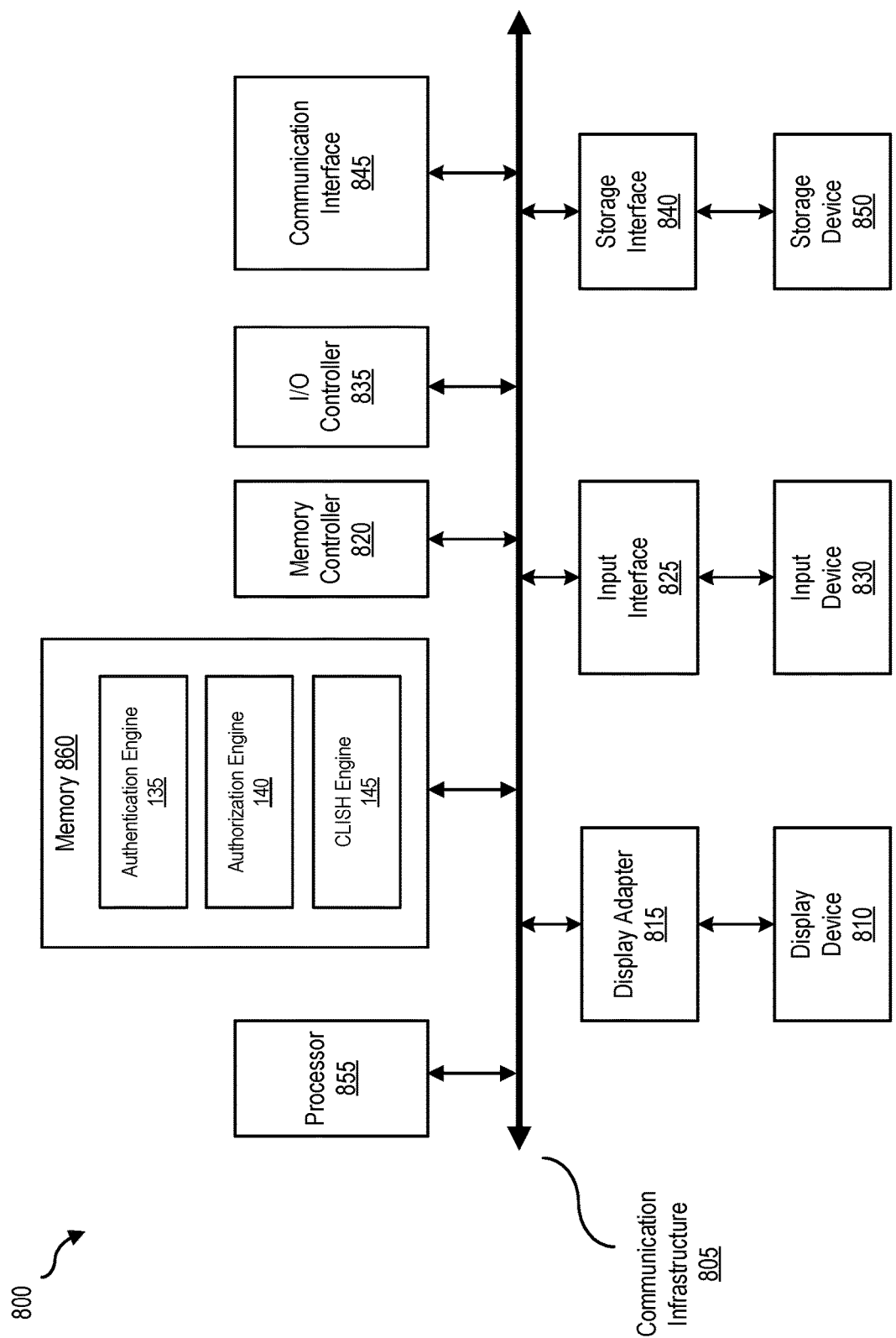
FIG. 8 is a block diagram 800 of a computing system, according to one embodiment of the present disclosure.

FIG. 8 is a block diagram of a computing system 800, according to one embodiment of the present disclosure. Computing system 800 can include appliance 115 and broadly represents any single or multi-processor computing device or system capable of executing computer-readable instructions. Examples of computing system 800 include, without limitation, any one or more of a variety of devices including workstations, personal computers, laptops, clientside terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 800 may include at least one processor 855 and a memory 860. By executing the software that executes authentication engine 135, authorization engine 140, and/or CLISH engine 145, computing system 800 becomes a special purpose computing device that is configured secure access to runtime services in appliance computing environments and/or ecosystems.

Processor 855 generally represents any type or form of processing unit capable of processing data or interpreting and executing instructions. In certain embodiments, processor 855 may receive instructions from a software application or module. These instructions may cause processor 855 to perform the functions of one or more of the embodiments described and/or illustrated herein. For example, processor 855 may perform and/or be a means for performing all or some of the operations described herein. Processor 855 may also perform and/or be a means for performing any other operations, methods, or processes described and/or illustrated herein. Memory 860 generally represents any type or form of volatile or non-volatile storage devices or mediums capable of storing data and/or other computer-readable instructions. Examples include, without limitation, random access memory (RAM), read only memory (ROM), flash memory, or any other suitable memory device. Although not required, in certain embodiments computing system 800 may include both a volatile memory unit and a non-volatile storage device. In one example, program instructions implementing authentication engine 135, authorization engine 140, and/or CLISH engine 145 may be loaded into memory 860.

In certain embodiments, computing system 800 may also include one or more components or elements in addition to processor 855 and/or memory 860. For example, as illustrated in FIG. 8, computing system 800 may include a memory controller 820, an Input/Output (I/O) controller 835, and a communication interface 845, each of which may be interconnected via a communication infrastructure 805. Communication infrastructure 805 generally represents any type or form of infrastructure capable of facilitating communication between one or more components of a computing device. Examples of communication infrastructure 805 include, without limitation, a communication bus (such as an Industry Standard Architecture (ISA), Peripheral Component Interconnect (PCI), PCI express (PCIe), or similar bus) and a network.

Memory controller 820 generally represents any type/form of device capable of handling memory or data or controlling communication between one or more components of computing system 800. In certain embodiments memory controller 820 may control communication between processor 855, memory 860, and I/O controller 835 via communication infrastructure 805. In certain embodiments, memory controller 820 may perform and/or be a means for performing, either alone or in combination with other elements, one or more of the operations or features described and/or illustrated herein.

I/O controller 835 generally represents any type or form of module capable of coordinating and/or controlling the input and output functions of an appliance and/or a computing device. For example, in certain embodiments I/O controller 835 may control or facilitate transfer of data between one or more elements of computing system 800, such as processor 855, memory 860, communication interface 845, display adapter 815, input interface 825, and storage interface 840.

Communication interface 845 broadly represents any type or form of communication device or adapter capable of facilitating communication between computing system 800 and one or more other devices. Communication interface 845 may facilitate communication between computing system 800 and a private or public network including additional computing systems. Examples of communication interface 845 include, without limitation, a wired network interface (such as a network interface card), a wireless network interface (such as a wireless network interface card), a modem, and any other suitable interface. Communication interface 845 may provide a direct connection to a remote server via a direct link to a network, such as the Internet, and may also indirectly provide such a connection through, for example, a local area network (e.g., an Ethernet network), a personal area network, a telephone or cable network, a cellular telephone connection, a satellite data connection, or any other suitable connection.

Communication interface 845 may also represent a host adapter configured to facilitate communication between computing system 800 and one or more additional network or storage devices via an external bus or communications channel. Examples of host adapters include, Small Computer System Interface (SCSI) host adapters, Universal Serial Bus (USB) host adapters, Institute of Electrical and Electronics Engineers (IEEE) 1394 host adapters, Serial Advanced Technology Attachment (SATA), Serial Attached SCSI (SAS), and external SATA (eSATA) host adapters, Advanced Technology Attachment (ATA) and Parallel ATA (PATA) host adapters, Fibre Channel interface adapters, Ethernet adapters, or the like. Communication interface 845 may also allow computing system 800 to engage in distributed or remote computing (e.g., by receiving/sending instructions to/from a remote device for execution).

As illustrated in FIG. 8, computing system 800 may also include at least one display device 810 coupled to communication infrastructure 805 via a display adapter 815. Display device 810 generally represents any type or form of device capable of visually displaying information forwarded by display adapter 815 (e.g., in a GUI). Similarly, display adapter 815 generally represents any type or form of device configured to forward graphics, text, and other data from communication infrastructure 805 (or from a frame buffer, as known in the art) for display on display device 810. Computing system 800 may also include at least one input device 830 coupled to communication infrastructure 805 via an input interface 825. Input device 830 generally represents any type or form of input device capable of providing input, either computer or human generated, to computing system 800. Examples of input device 830 include a keyboard, a pointing device, a speech recognition device, or any other input device.

Computing system 800 may also include storage device 850 coupled to communication infrastructure 805 via a storage interface 840. Storage device 850 generally represents any type or form of storage devices or mediums capable of storing data and/or other computer-readable instructions. For example, storage device 850 may include a magnetic disk drive (e.g., a so-called hard drive), a floppy disk drive, a magnetic tape drive, an optical disk drive, a flash drive, or the like. Storage interface 840 generally represents any type or form of interface or device for transferring and/or transmitting data between storage device 850, and other components of computing system 800. Storage device 850 may be configured to read from and/or write to a removable storage unit configured to store computer software, data, or other computer-readable information. Examples of suitable removable storage units include a floppy disk, a magnetic tape, an optical disk, a flash memory device, or the like. Storage device 850 may also include other similar structures or devices for allowing computer software, data, or other computer-readable instructions to be loaded into computing system 800. For example, storage device 850 may be configured to read and write software, data, or other computer-readable information. Storage device 850 may also be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from that shown in FIG. 8. Computing system 800 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 800 for storage in memory via a network such as the Internet or upon a carrier medium.

The computer-readable medium containing the computer program may be loaded into computing system 800. All or a portion of the computer program stored on the computer-readable medium may then be stored in client computing device 110, appliance 115, and/or storage device 850. When executed by processor 855, a computer program loaded into computing system 800 may cause processor 855 to perform and/or be a means for performing the functions of one or more of the embodiments described/illustrated herein. Additionally or alternatively, one or more of the embodiments described and/or illustrated herein may be implemented in firmware and/or hardware. For example, computing system 800 may be configured as an application specific integrated circuit (ASIC) adapted to implement one or more of the embodiments disclosed herein.

Example Networking Environment

Figure 9:
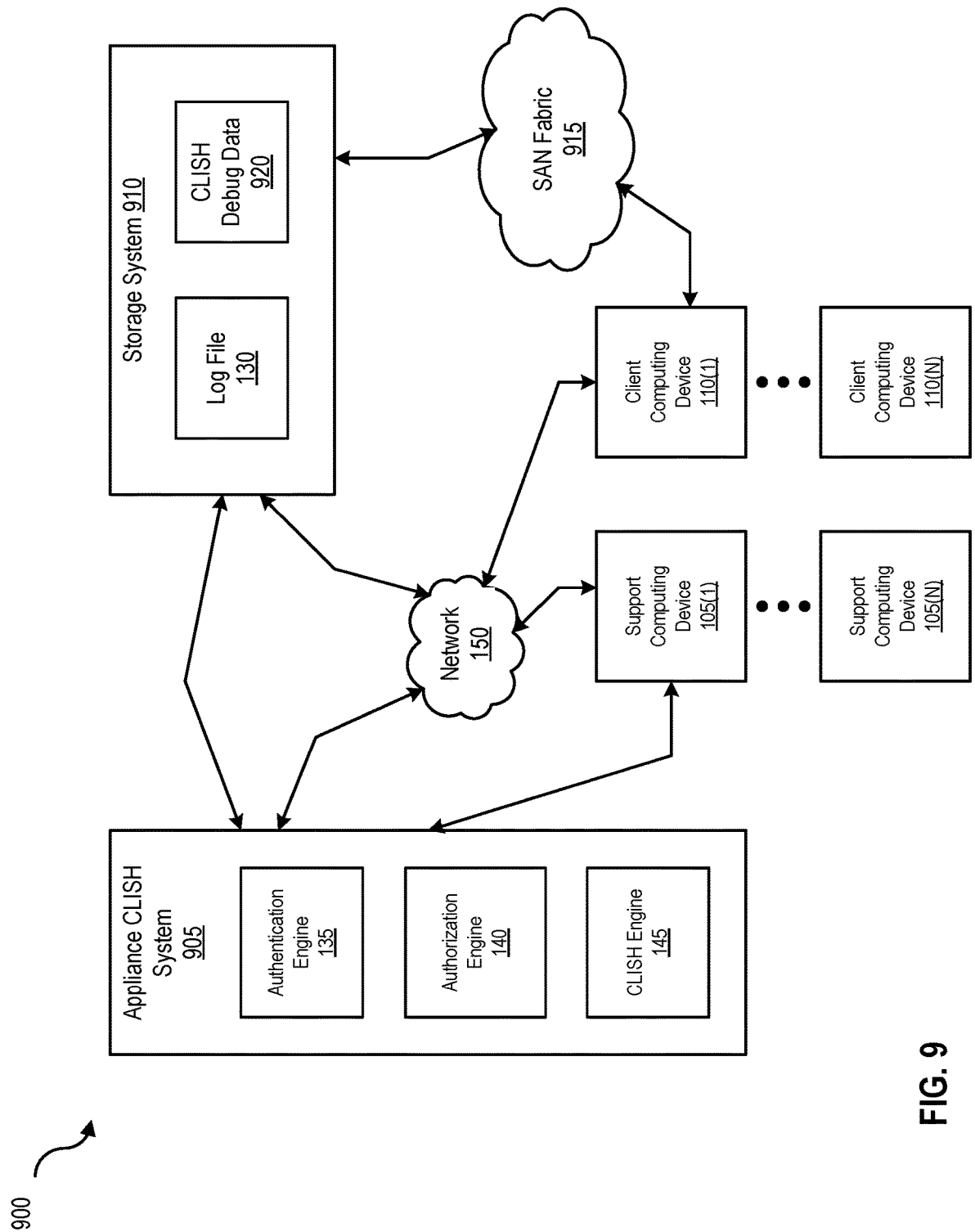
FIG. 9 is a block diagram 900 of a networked system, according to one embodiment of the present disclosure.

FIG. 9 is a block diagram of a networked system, illustrating how various computing devices can communicate via a network, according to one embodiment. In certain embodiments, network-attached storage (NAS) devices may be configured to communicate with appliance 115 using Network File System (NFS), Server Message Block (SMB), or Common Internet File System (CIFS). Network 150 generally represents any type or form of computer network or architecture capable of facilitating communication between support computing devices 105(1)-(N), client computing device 110(1)-(N), and/or appliance 115.

In certain embodiments, a communication interface, such as communication interface 845 in FIG. 8, may be used to provide connectivity between support computing devices 105(1)-(N), client computing device 110(1)-(N), and/or appliance 115, and network 150. The embodiments described and/or illustrated herein are not limited to the Internet or any particular network-based environment. In some embodiments, network 150 can be a Storage Area Network (SAN). In other embodiments, authentication engine 135, authorization engine 140, and/or CLISH engine 145 may be part of appliance 115, or may be separate. If separate, computing devices 105(1)-(N), client computing device 110(1)-(N), and/or appliance 115 and the computing device authentication engine 135, authorization engine 140, and/or CLISH engine 145 is implemented in (e.g., appliance CLISH system 905) may be communicatively coupled via network 150.

In one embodiment, all or a portion of one or more of the disclosed embodiments may be encoded as a computer program and loaded onto and executed by appliance 115. All or a portion of one or more of the embodiments disclosed herein may also be encoded as a computer program, stored on appliance 115 or storage system 910, and distributed over network 150.

In some examples, all or a portion of deduplication backup server 125 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, authentication engine 135, authorization engine 140, and/or CLISH engine 145 may transform the behavior of appliance 115 to secure access to runtime systems in appliances that implement CLISH computing environments.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A computer-implemented method comprising:
generating a security token at a client controlled computing device, wherein
the security token is generated and sent to a support computing device to authorize limited access to a debug mode of an appliance that is providing business services to the client controlled computing device,
the security token is configured to limit access to the debug mode using debug mode login credentials, and
the security token is configured to control types of commands that are available through a command line interface shell (CLISH) in the debug mode of the appliance;
receiving a first request to register the security token from the client controlled computing device at the appliance, wherein
the appliance comprises software configured to perform one or more internal computing services, a graphical user interface (GUI), and the CLISH, and
the security token is received from the client controlled computing device at the GUI, the appliance is configured to prevent access to change the one or more internal computing services during a runtime mode of operation of the appliance, the appliance is configured with the debug mode, and the debug mode is configured to be accessed via the CLISH, wherein the CLISH is configured as a restrictive shell to restrict direct access to low-level functions of the appliance while in the debug mode;

receiving a second request to register the security token from the support computing device that is different from the client controlled computing device and that provides technical support to the appliance without receiving business services therefrom, wherein the second request to register the security token is received from the support computing device at the GUI of the appliance;

in response to receiving the second request to register the security token from the support computing device at the GUI of the appliance, determining, by the appliance, that the security token authorizes access to the debug mode, sending an authorization response authenticating the security token to the support computing device, receiving login credentials and token authorization information at the CLISH from the support computing device, and authorizing the support computing device to access the debug mode if the token authorization information indicates that the support computing device is authorized to access the debug mode of the appliance;

receiving command line commands at the CLISH from the support computing device to perform one or more operations in the debug mode of the appliance, wherein the one or more operations are configured to be performed in response to the command line commands received from the support computing device at the CLISH, and commands available through the CLISH in the debug mode are limited, at least in part, to the types of commands authorized by the security token; and allowing multiple, separate commands to be received at the CLISH from the support computing device and executed during the debug mode so long as the security token remains authorized.

2. The computer-implemented method of claim 1, wherein the security token comprises a Quick Response (QR) code, and the authorization response authenticating the security token is sent if the security token matches the QR code.

3. The computer-implemented method of claim 1, further comprising:

determining that the access to the debug mode of the appliance has expired as determined by authorizations associated with the security token; and invalidating the security token associated with the second request when the access to the debug mode of the appliance has expired as determined by authorizations associated with by security token.

4. The computer-implemented method of claim 1, further comprising:

permitting debugging of one or more input commands and/or one or more output commands using the CLISH, without entering an operating system of the appliance in a way that would require elevation of the security token to a root privilege.

5. The computer-implemented method of claim 4, wherein preventing elevation of the security token to the root privilege does not prevent monitoring of a real-time output of the one or more output commands, and the real-time output occurs during a runtime state of the appliance.

6. A non-transitory computer readable storage medium comprising program instructions executable to perform a method comprising:

generating a security token at a client controlled computing device, wherein the security token is generated and sent to a support computing device to authorize limited access to a debug mode of an appliance that is providing business services to the client controlled computing device, the security token is configured to limit access to the debug mode using debug mode login credentials, and the security token is configured to control types of commands that are available through a command line interface shell (CLISH) in the debug mode of the appliance;

receiving a first request to register the security token from the client controlled computing device at the appliance, wherein the appliance comprises software configured to perform one or more internal computing services while in a runtime mode of operation of the appliance, a graphical user interface (GUI), and the CLISH, and the security token is received from the client controlled computing device at the GUI, the appliance is configured to prevent access to change the one or more internal computing services during the runtime mode of operation of the appliance, the appliance is configured with the debug mode, and the debug mode is configured to be accessed via the CLISH, wherein the CLISH is configured as a restrictive shell to restrict direct access to low-level functions of the appliance while in the debug mode;

receiving a second request to register the security token from the support computing device that is different from the client controlled computing device and that provides technical support to the appliance without receiving business services therefrom, wherein the second request to register the security token is received from the support computing device at the GUI of the appliance;

in response to receiving the second request to register the security token from the support computing device at the GUI of the appliance, determining, by the appliance, that the security token authorizes access to the debug mode, sending an authorization response authenticating the security token to the support computing device, receiving login credentials and token authorization information at the CLISH from the support computing device, and authorizing the support computing device to access the debug mode if the token authorization information indicates that the support computing device is authorized to access the debug mode of the appliance;

receiving command line commands at the CLISH from the support computing device to perform one or more operations in the debug mode of the appliance, wherein the one or more operations are configured to be performed in response to the command line commands received from the support computing device at the CLISH, and commands available through the CLISH in the debug mode are limited, at least in part, to the types of commands authorized by the security token; and allowing multiple, separate commands to be received at the CLISH from the support computing device and executed during the debug mode so long as the security token remains authorized.

7. The non-transitory computer readable storage medium of claim 6, wherein the security token comprises a Quick Response (QR) code, and the authorization response authenticating the security token is sent if the security token matches the QR code.

8. The non-transitory computer readable storage medium of claim 6, wherein the method further comprises:

determining that the access to the debug mode of the appliance has expired; and invalidating the security token associated with the second request.

9. The non-transitory computer readable storage medium of claim 6, wherein the method further comprises:

permitting debugging of one or more input commands and/or one or more output commands using the CLISH, without entering an operating system of the appliance in a way that would require elevation of the security token to a root privilege.

10. The non-transitory computer readable storage medium of claim 9, wherein preventing elevation of the security token to the root privilege does not prevent monitoring of a real-time output of the one or more output commands; and the real-time output occurs during a runtime state of the appliance.

11. A system comprising:

a client controlled computing device;

a support computing device;

an appliance;

wherein the client controlled computing device, the support computing device, and the appliance are configured with instructions executable by one or more processors to cooperatively perform a method comprising:

generating a security token at the client controlled computing device, wherein the security token is generated and sent to the support computing device to authorize limited access to a debug mode of the appliance that is providing business services to the client controlled computing device, the security token is configured to limit access to the debug mode using debug mode login credentials, and the security token is configured to control types of commands that are available through a command line interface shell (CLISH) in the debug mode of the appliance;

receiving a first request to register the security token from the client controlled computing device at the appliance, wherein the appliance comprises software configured to perform one or more internal computing services, a graphical user interface (GUI), and the CLISH, and the security token is received from the client controlled computing device at the GUI, the appliance is configured to prevent access to change the one or more internal computing services during a runtime mode of the appliance, the appliance is configured with the debug mode, and the debug mode is configured to be accessed via the CLISH, wherein the CLISH is configured as a restrictive shell to restrict direct access to low-level functions of the appliance while in the debug mode;

receiving a second request to register the security token from the support computing device that is different from the client controlled computing device and that provides technical support to the appliance without receiving business services therefrom, wherein the second request to register the security token is received from the support computing device at the GUI of the appliance;

in response to receiving the second request to register the security token from the support computing device at the GUI of the appliance, determining, by the appliance, that the security token authorizes access to the debug mode, sending an authorization response authenticating the security token to the support computing device, receiving login credentials and token authorization information at the CLISH from the support computing device, and authorizing the support computing device to access the debug mode if the token authorization information indicates that the support computing device is authorized to access the debug mode of the appliance;

receiving command line commands at the CLISH from the support computing device to perform one or more operations in the debug mode of the appliance, wherein the one or more operations are configured to be performed in response to the command line commands received from the support computing device at the CLISH, and commands available through the CLISH in the debug mode are limited, at least in part, to the types of commands authorized by the security token; and allowing multiple, separate commands to be received at the CLISH from the support computing device and executed during the debug mode so long as the security token remains authorized.

12. The system of claim 11, wherein the security token comprises a Quick Response (QR) code, and the authorization response authenticating the security token is sent if the security token matches the QR code.

13. The system of claim 11, wherein the method further comprising:

permitting debugging of one or more input commands and/or one or more output commands using the CLISH, without entering an operating system of the appliance in a way that would require elevation of the security token to a root privilege.

14. The system of claim 13, wherein preventing elevation of the security token to the root privilege does not prevent monitoring of a real-time output of the one or more output commands; and the real-time output occurs during a runtime state of the appliance.

* * * * *